United States Patent [19]

Caruso

[11] 4,282,344
[45] Aug. 4, 1981

[54] POLYURETHANE CURING AGENT DISPERSION, PROCESS AND PRODUCT

[75] Inventor: Paul P. Caruso, Wilmington, Del.

[73] Assignee: E. I. Du Pont de Nemours and Company, Wilmington, Del.

[21] Appl. No.: 96,563

[22] Filed: Nov. 21, 1979

Related U.S. Application Data

[63] Continuation-in-part of Ser. No. 957,226, Nov. 2, 1978, abandoned.

[51] Int. Cl.$^3$ ................... C08G 18/32; C08G 18/65
[52] U.S. Cl. ........................... 528/51; 260/31.8 R; 252/182; 528/64
[58] Field of Search ............... 528/64, 51; 252/182

[56] References Cited

U.S. PATENT DOCUMENTS

| | | | |
|---|---|---|---|
| 3,876,604 | 4/1975 | Caruso et al. | 260/31.8 S |
| 3,891,606 | 6/1975 | Kogon | 528/64 |
| 3,899,438 | 8/1975 | Kalil | 252/182 |
| 4,075,150 | 2/1978 | Hoeschele | 260/30.6 R |

OTHER PUBLICATIONS

Saunders et al., Polyurethanes, Part I, Interscience, New York (1962), pp. 116–118.

*Primary Examiner*—H. S. Cockeram

[57] ABSTRACT

To a dispersion of a complex of 3 moles of 4,4'-methylenedianiline with 1 mole of a specified inorganic salt in an inert liquid, which still contains some free methylenedianiline, there is added, with agitation, at least 0.5 equivalent of an organic isocyanate per equivalent of free methylenedianiline. Then, there is added, while continuing agitation, at least 0.5 weight % of lecithin. The resulting dispersion is a good curing agent for isocyanato-terminated polyurethane prepolymers. Compositions containing both the prepolymer and the curing agent of this invention have good shelf stability at room temperature and cure to polyurethane products having good physical properties and hydrolytic stability.

13 Claims, No Drawings

POLYURETHANE CURING AGENT DISPERSION, PROCESS AND PRODUCT

CROSS-REFERENCE TO A COPENDING APPLICATION

This is a continuation in part of application Ser. No. 957,226 filed Nov. 2, 1978.

BACKGROUND OF THE INVENTION

This invention relates to compositions useful for curing polyurethane prepolymers, to a process for preparing such curing compositions, and to curable compositions made by mixing such curing compositions with isocyanato-terminated prepolymers.

It is known that compositions useful in curing isocyanato-terminated polyurethane prepolymers can be made by dispersing particles of a complex of 4,4'-methylenedianiline (MDA) with a salt in an inert organic liquid. However, such prior art compositions have the drawback that their mixtures with polyurethane prepolymers have poor shelf life, as indicated by their tendency to undergo an undue increase in viscosity during storage. There is a need in the art for a curing composition which forms mixtures with prepolymers having good shelf life at room temperature and slightly above, and having the ability to cure rapidly at an elevated temperature to form well-cured polyurethane products.

U.S. Pat. No. 4,075,150 to Hoeschele addresses the same problem. The drawback of that invention, however, is poor hydrolytic stability of polyurethanes prepared by that process.

SUMMARY OF THE INVENTION

The present invention provides a process for preparing a composition which is useful for curing a polyurethane prepolymer, said process comprising
(1) forming a mixture of a substantially inert organic liquid, (A), with particles, (B), of a complex of 3 moles of 4,4'-methylenedianiline and 1 mole of a salt selected from the group: sodium chloride, sodium bromide, sodium iodide, lithium chloride, lithium bromide and lithium iodide, said particles having an average diameter of less than 60 microns; the weight proportion of liquid (A) in the mixture being about 20-90%, and that of particles (B) being about 10-80%, said mixture having a free methylenedianiline content of about 0.1-5% by weight;
(2) adding to said mixture with good agitation at least 0.5 equivalent of an organic isocyanate per equivalent of the free methylenedianiline,
(3) while continuing agitation, allowing said organic isocyanate to react with said methylenedianiline; and
(4) adding at least 0.5 weight % of lecithin.

The invention also provides a composition useful for curing a polyurethane prepolymer, which comprises a substantially inert organic liquid, (A), and dispersed in component (A), particles, (B), of a complex of 4,4'-methylenedianiline and a salt, selected from the group: sodium chloride, sodium bromide, sodium iodide, lithium chloride, lithium bromide and lithium iodide; the composition being obtained by adding with good agitation an organic isocyanate to a dispersion of (B) in (A) which has a free methylenedianiline content of about 0.1-5% by weight; while continuing agitation, allowing said organic isocyanate to react with said methylenedianiline, the amount of organic isocyanate added being at least 0.5 equivalent per equivalent of free methylenedianiline originally present in said mixture; and adding at least 0.5 weight % of lecithin.

Also provided by the invention is a heat-curable composition useful for preparing cured polyurethane products, which comprises
(I) the above curing composition and
(II) an isocyanato-terminated prepolymer, the ratio of components I and II being such that the heat-curable composition contains about 0.7-1.2 equivalents of amine groups per equivalent of NCO groups.

DESCRIPTION OF PREFERRED EMBODIMENTS

The curing compositions of this invention preferably contain the substantially inert organic liquid (A) in an amount equal to about 25-60%, based on the combined weight of components (A) and (B). These compositions can be referred to as curing agent compositions, or simply as curing agents.

Component (A) is "substantially inert" in the sense that it will not cause undesirable dissociation of component (B) and will not undergo undesirable reactions with the isocyanato groups of the polyurethane prepolymer at the temperatures encountered in preparing and using the composition.

Preferably, component (A) is a free-flowing, high-boiling liquid which is readily miscible with the polyurethane prepolymer to be cured and compatible enough with the cured polyurethane obtained, so that there will be substantially no exudation of the liquid from the product. It is usually preferred to use a liquid having a boiling point above 200° C. Many of the liquids known in the plastic art as plasticizers can be used as component (A) of the present composition. For example, many of the plasticizers listed in the following publication can be used: Modern Plastics Encyclopedia, 1975-1976, pp. 692-702, McGraw-Hill Publishers. Especially preferred are di(2-ethylhexyl)phthalate, tetraethylene glycol bis(2-ethylhexanoate), tri(isopropylphenyl) phosphate and blends thereof. Also useful are other liquids selected from the following types: (1) esters of polycarboxylic acids and monohydric alcohols or phenols, (2) esters of polyols and monocarboxylic acids, (3) low molecular weight linear polyesters prepared from diols and dicarboxylic acids and chain-terminated with monocarboxylic acids or monohydric alcohols, (4) aromatic derivatives selected from biphenyl, terphenyl and diphenyl ether and their halogenated derivatives, (5) chlorinated paraffins having a chlorine content of about 35-65% by weight and a specific gravity of about 1.1-1.5 at 25° C., (6) triesters of phosphoric acid, and (7) aromatic hydrocarbon oils derived from petroleum and having a molecular analysis by the clay-gel method of ASTM D-2007 of about 50-100% by weight aromatic hydrocarbons, about 0-35% by weight saturated hydrocarbons and about 0-30% by weight polar compounds, and blends of two or more such liquids.

It is known in the art that the above type (1) liquids can be prepared by esterification of an acid such as phthalic, isophthalic, mellitic, adipic, azelaic, sebacic, maleic or fumaric with an alcohol such as butyl, isobutyl, 2-ethylhexyl, cyclohexyl or isodecyl or with a phenolic compound such as o-cresol or phenol. The type (2) liquids can be prepared by esterifying a polyol such as glycerol, diethylene glycol, tri- or tetraethylene glycol, pentaerythritol or dipropylene glycol with an acid such as acetic, 2-ethylhexanoic, caproic, pelargonic or benzoic. The type (3) liquids are polyesters of low molecular weight (e.g., below 2000). Examples of the type (6) liquids are triphenyl phosphate, tricresyl phosphate, tri-n-butyl phosphate, tri(2-ethylhexyl) phosphate, octyldiphenyl phosphate and tri(isopropylphenyl) phosphate.

The preferred proportion of component (B) particles of a complex of 4,4'-methylenedianiline with a salt is about 40-75%, based on the combined weight of components (A) and (B). The salt portion of the complex is preferably sodium chloride. The particles of complex preferably have an average diameter of less than 11 microns. The average diameter of the particles can be determined by means of a photomicrograph in a known manner.

In preparing the present composition, one forms a mixture of the liquid component (A) and the particles of component (B). The resulting mixture, as used in this invention, contains about 0.1-5%, preferably about 0.4-3%, of free methylenedianiline (MDA) based on the weight of the mixture. The concentration of free MDA is largely a function of the purity of the complex and the particular inert liquid used to prepare the dispersion. Regardless of the purity of the complex and the choice of the inert liquid, the resulting mixtures have always been found to contain some free MDA.

A preferred method for preparing the mixture of inert liquid (A) and complex particles (B) is that taught by Kalil in U.S. Pat. No. 3,899,438. This method comprises carrying out the complex-forming reaction between 4,4'-methylenedianiline and the salt in the presence of an inert organic liquid of the type described above plus at least 0.5 part of water per 100 parts of the salt, the amount of water present being insufficient to dissolve all the salt until the complex-forming reaction is at least 50% complete. For use in this invention, the water is removed from the resulting dispersion. Any suitable known method can be used, for example, by subjecting the dispersion to a vacuum at about 60°-70° C. Dispersions formed by the Kalil method contain a small amount of 2,4'-MDA and 2,2'-MDA in addition to the 4,4'-MDA as the free diamines unless pure 4,4'-MDA is used as a starting material. The 2,4'-MDA and 2,2'-MDA cannot be separated economically from 4,4'-MDA, and commercial MDA normally contains about 2-3% of those impurities. The 2,4'-MDA and 2,2'-MDA are not capable of complex formation and remain in solution in the inert liquid along with the free 4,4'-MDA normally found in dispersions of the complex.

The mixture of components (A) and (B) can also be prepared by other methods known to be useful for making dispersions of the complex particles in an inert organic liquid. For example, one can use the method taught by Caruso and Verbanc in U.S. Pat. No. 3,876,604, which comprises forming particles of the complex of MDA and a salt in a separate operation, then, combining said particles with a suitable inert organic liquid and agitating the resulting combination until a uniform dispersion of the particles in the liquid is obtained, using sufficient shearing or grinding means to insure that the complex particles have the desired small diameter. In this procedure, most of the 2,4'-MDA and 2,2'-MDA are separated out when the complex is prepared. The resulting dispersion still contains free 4,4'-MDA.

The dispersion preferably will also contain an oil-soluble surfactant in an amount equal to about 0.1-5.0% based on the total weight of the composition. Preferred surfactants include lecithin, polyoxypropylated quaternary ammonium halides and phosphated glycerides (e.g., "Emcol" D70-30C from Witco Chemical Corp.). These surfactants are preferably employed at a level of 0.5-2.0% based on the total weight of components (A) and (B).

The novel curing agent composition is made by adding to said dispersion at least 0.5 equivalent, usually 0.5-2.0 equivalents, preferably about 0.5-1.0 equivalent, of an organic isocyanate per equivalent of the free MDA present in the mixture and allowing the isocyanate to react with the MDA. During the addition and reaction of the isocyanate, agitation is required. While the isocyanate can be added neat, it is preferred to add it as a solution in an inert liquid of the type described for component (A). Adding the isocyanate as a solution appears to assist in blending the isocyanate uniformly throughout the curing agent dispersion. During this step the temperature should be maintained at 50° C. or below.

Following the addition and the reaction of the isocyanate, it is critical to add an oil-soluble surfactant to the dispersion. In the absence of this surfactant, the curing agent, which is thixotropic, sets to a solid paste which is impractical to use. The added surfactant maintains the isocyanate-modified dispersion in a usable condition during storage. It is important to note that the presence of a surfactant prior to the addition of the isocyanate is ineffective in avoiding the formation of the solid paste. Lecithin has been found to give consistently good results in this application. The amount of lecithin added at this point, regardless of the amount present prior to isocyanate addition, should be at least 0.5 weight %. The amount of lecithin used is generally between 0.5 and 2.0%, preferably 0.7-1.7 weight %.

The organic isocyanate used in preparing the compositions of this invention may be an aliphatic, cycloaliphatic or aromatic mono- or polyisocyanate. Representative monoisocyanates include phenyl isocyanate, p-tolyl isocyanate, cyclohexyl isocyanate and butyl isocyanate. Representative polyisocyanates include tolylene-2,4-diisocyanate and its mixtures with tolylene-2,6-diisocyanate, 4,4'-methylenebis(phenyl isocyanate), 2,4,4'-triisocyanato-diphenyl ether, phenylene-1,4-diisocyanate, 4,4'-methylenebis(cyclohexyl isocyanate), 1,6-hexamethylene diisocyanate and 1,4-cyclohexylene diisocyanate. Because of their availability and the fact that they are liquid, tolylene-2,4-diisocyanate and its commercial mixtures with tolylene-2,6-diisocyanate are preferred.

In preparing the heat-curable compositions of the present invention, the curing agent composition and an isocyanato-terminated prepolymer are blended in proportions such that the resulting mixture contains about 0.7-1.2, preferably about 0.85-1.1, equivalents of amine groups per equivalent of —NCO groups. To illustrate the weight ratio of components one could use in typical applications, about 10-60 grams of curing agent composition can be mixed with 100 grams of isocyanato-terminated prepolymer when using a curing agent composition having a 50:50 weight ratio of inert organic liquid to particles of a complex of 3 moles of MDA and 1 mole of sodium chloride.

The prepolymer of this heat-curable composition is preferably the product of a reaction of a molar excess of an organic diisocyanate with a polyalkylene ether glycol or a polyester glycol having a molecular weight of about 300–3000 and optionally with a diol having a molecular weight of less than 250. Other known isocyanato-terminated prepolymers can also be used, as will be apparent to one skilled in polyurethane chemistry. In preparing the prepolymer, it is preferred to use about 1.2–4.0 moles (with particular preference for about 1.5–2.5 moles) of the diisocyanate for each mole of glycol plus diol used. Examples of useful organic diisocyanates are 2,4- and 2,6-tolylene diisocyanates, 4,4'-methylenebis(phenyl isocyanate), 4,4'-methylenebis(cyclohexyl isocyanate), hexamethylene diisocyanate and 1-isocyanato-2-isocyanatomethyl-3,5,5-trimethylcyclohexane. Part of the diisocyanate (e.g., about 1–25% by weight) can be replaced with a triisocyanate, for example, 2,4,4'-triisocyanatodiphenyl ether. Examples of useful materials with which the organic isocyanate can be reacted to form the prepolymer are a polyalkylene glycol (e.g., polyethylene ether glycol, polypropylene ether glycol or polytetramethylene ether glycol); a polyether made by copolymerizing a cyclic ether (e.g., ethylene oxide, propylene oxide, trimethylene oxide or tetrahydrofuran) with an aliphatic polyol (e.g., ethylene glycol, 1,3-butanediol, diethylene glycol, dipropylene glycol, 1,2-propylene glycol or 1,3-propylene glycol); a polyester glycol made by polymerizing a cyclic lactone (e.g., $\epsilon$-caprolactone) in the presence of a diol, or by the condensation polymerization of a dicarboxylic acid (or its ester-forming equivalent) and a molar excess of a polyol; or a blend of two or more such materials. Examples of these and other materials which can be used to prepare the prepolymer will be apparent from such prior art as Hoeschele U.S. Pat. No. 2,984,645, Columns 5 and 6, and the references listed by Caruso and Verbanc in U.S. Pat. No. 3,876,604, Column 6, lines 46–48.

The composition can also contain one or more additives such as those known to be useful in curable polyurethane prepolymer compositions, for example coloring agents, fillers, solvents, stabilizers, anti-settling agents, and pore-forming agents.

The curing agent compositions of this invention can be prepared economically by a simple process and can be mixed with polyurethane prepolymers to form heat-curable compositions having good storage stability for reasonable period at temperatures not over 50° C. without showing an undue increase in viscosity but curing rapidly to high quality cured polyurethane products when heated (e.g., about 80°–180° C.). It is an important advantage that a curable composition of this type will retain a useful low viscosity for an extended period regardless of whether the mixture of components (A) and (B) used to form the curing agent composition is prepared by the procedure of U.S. Pat. No. 3,899,438 or that of U.S. Pat. No. 3,876,604.

The following examples illustrate the invention; all amounts are by weight unless otherwise indicated. All Brookfield viscosity values are obtained by using an RVT model viscometer of Brookfield Engineering Laboratories, Stoughton, Mass.

EXAMPLE 1

A dispersion of a 4,4'-methylenedianiline/sodium chloride complex is prepared by: (1) forming a mixture of 225 g of di(2-ethylhexyl) phthalate, 19.5 g of sodium chloride, 64 g of water, 1.48 g of lecithin and 7.52 g of a polyoxypropylated quaternary ammonium chloride which is believed to have the formula $$[CH_3N(C_2H_5)_2([C_3H_6O]_{40}H)]^+Cl^-,$$

sold as "Emcol" CC42 by Witco Chemical Corp.; (2) while the resulting mixture is agitated under moderate to high shear conditions, adding 198 g of flaked 4,4'-methylenedianiline; (3) continuing the mixing of the composition for one hour while maintaining its temperature at 58°–60° C. by regulating the shear input by means of a variable voltage transformer; and (4) removing the water from the resulting dispersion of complex particles in the organic liquid by distillation in an agitated flask at 60° C. under subatmospheric pressure. The resulting composition is a typical prior art curing agent dispersion.

The particles of the dispersion obtained in step (4) are particles of a complex of 3 moles of MDA with 1 mole of sodium chloride. These particles are found to have an average diameter of less than 11 microns when examined in a customary manner by means of a photomicrograph. There is no need for further operations to reduce the size of the particles since they are already fine enough for most applications.

The dispersion obtained in step (4) has a free MDA content of 2.25%, as determined by separating the complex particles from the liquid phase by high-speed centrifugation (15,000 rpm) and then analyzing the clear liquid for MDA content by potentiometric titration with 0.1 N 2,4-dinitrobenzenesulfonic acid in acetic acid.

A curing composition representative of this invention is prepared by performing the following additional steps: (5) adding 2.3 parts of an 80/20 mixture of 2,4-/2,6-tolylene diisocyanate as a 15% solution in di(2-ethylhexyl) phthalate per 100 parts of the dispersion of step (4) with agitation at 26° C. and holding for 1 hour with agitation, and (6) adding 1.0 part of lecithin per 102.3 parts of the dispersion of step (5) with agitation at 26° C.

The dispersion obtained in step (6) has a total amino nitrogen content of 6.1% and a Brookfield viscosity (50 rpm, No. 5 spindle, at 25° C.) of 4.2 Pa·s.

The use of the curing composition of this invention in preparing a curable polyurethane is illustrated in Example 2 and compared to the use of the prior art curing composition of step (4).

EXAMPLE 2

A prepolymer is prepared by reacting 1.68 moles (292 g) of an 80/20 mixture of 2,4-/2,6-tolylene diisocyanate with a mixture of 0.57 mole (570 g) of polytetramethylene ether glycol (PTMEG) having a number average molecular weight of 1000 and 0.43 mole (903 g) of PTMEG having a number average molecular weight of 2100 for 3 hours at 80° C. The resulting prepolymer has an NCO content of 3.25% and a Brookfield viscosity of 28 Pa·s at 30° C.

A curable polyurethane composition is prepared by mixing 681 g of the above prepolymer with 123 g of the curing agent dispersion obtained in step (6) of Example 1. The mixture of prepolymer and dispersion is maintained at 40° C. or below during mixing. The resulting composition, which is heat-curable, has a Brookfield viscosity of 16.6 Pa·s at 39° C. (No. 5 spindle, 2.5 rpm). The curable mixture is cooled to 25° C. and held for 4 hours, at which time the viscosity at 25° C. is 39.2 Pa·s.

After 28 hours, the viscosity increases very slightly to 40.0 Pa·s. A sample of the curable polyurethane composition is heated to 175° C. for 5 minutes to form a resilient cured elastomer having a Shore A hardness of 82.

The long term storage stability of this composition is excellent. After storage for 243 days at about 25° C., the composition has a Brookfield viscosity of 17.8 Pa·s at 40° C. (No. 6 spindle, 50 rpm).

For control purposes, a curable polyurethane composition is prepared from the prior art dispersion of step (4) in Example 1. A mixture of 120 g of the prior art dispersion and 681 g of the prepolymer of this example is prepared at 40° C. The curable mixture is cooled to 25° C. and held for 4 hours, at which time its Brookfield viscosity is 80.6 Pa·s (No. 5 spindle, 2.5 rpm). This is slightly more than double the viscosity observed for the curable composition of this invention. This viscosity is sufficiently high to complicate or prevent use of the mixture in ordinary fluid rubber casting and molding operations.

EXAMPLE 3

A composition which is useful for curing polyurethane prepolymers is prepared by: (1) providing a quantity of particles of a complex of 3 moles of MDA and 1 mole of sodium chloride, made by a known process (see the teaching of Caruso & Verbanc in U.S. Pat. No. 3,876,604, Column 2, line 55 to Column 3, line 35); (2) ball-milling 50 parts of the complex particles of step (1) with 50 parts of di(2-ethylhexyl) phthalate and 1 part of lecithin at 30° C. in an intermittent type attritor (from Union Process, Inc., Akron, Ohio) provided with water cooling for five hours; (3) adding 1.4 parts of an 80/20 mixture of 2,4-/2,6-tolylene diisocyanate alone, or as a 15% solution in di(2-ethylhexyl) phthalate per 100 parts of the dispersion of step (2) with agitation at 26° C. for 1 hour; and (4) adding 1.0 part of lecithin per 101.4 parts of the dispersion of step (3) with agitation at 26° C.

The complex particles of the resulting composition have an average diameter of less than 20 microns. The intermediate composition obtained in step (2) has a free MDA content of 0.5% and an amino nitrogen content of 6.3%. The curing composition obtained in step (2) is representative of the prior art.

A curable polyurethane composition is prepared by mixing 681 g of the prepolymer prepared in Example 2 with 123 g of the curing agent of this example. The mixture of prepolymer and the dispersion is maintained at 40° C. during mixing then cooled to about 25° C. and held for 4 hours, at which time the Brookfield viscosity is 31.2 Pa·s (No. 5 spindle, 2.5 rpm).

A sample of the curable polyurethane composition is heated to 175° C. for 5 min and yields a cured polyurethane elastomer having a Shore A hardness of 85.

When the prior art curing dispersion of step (2) of this example (120 g) is mixed at 40° C. with 681 g of the prepolymer of Example 2, a curable polyurethane composition is obtained which after 4 hours storage at 25° C. has a Brookfield viscosity of about 80·Pa·s (No. 5 spindle, 2.5 rpm).

EXAMPLE 4

A curable polyurethane composition is prepared by mixing 190 g of the curing agent dispersion from step (6) of Example 1 with 550 g of a polyurethane prepolymer prepared by reacting 348 parts of tolylene-2,4-diisocyanate with 1000 parts of PTMEG having a number average molecular weight of 1000 for 3 hours at 80° C. The prepolymer is heated to 40° C. before mixing with the curing agent dispersion. Once the curable polyurethane composition has been prepared, it is cooled to 25° C. and stored at 25° C. Viscosities are determined following storage for the periods shown in the following table.

| Time, after mixing | Brookfield viscosity at 25° C. Pa's (Spindle No., rpm) |
| --- | --- |
| 1 hour | 13.8 (5; 2.5) |
| 24 hours | 14.4 (5; 2.5) |
| 30 days | 13.0 (5; 2.5) |
| 6 months | 11.3 (5; 20) |

It is seen that even after 6 months storage, the curable polyurethane composition is still sufficiently fluid for use in casting applications. Following storage, the composition can be cured to a tough elastomer having a Shore D hardness of about 50 by heating to 130° C. for 60 minutes.

EXAMPLE 5

The hydrolytic stability of polyurethanes cured with the curing agent composition of the present invention was compared with that of polyurethanes cured with prior art compositions of Caruso and Verbanc (U.S. Pat. No. 3,876,604) and of Hoeschele (U.S. Pat. No. 4,075,150).

Curing Agent A-1 (Prior Art—Caruso and Verbanc)

A dispersion of a 4,4'-methylenedianiline/sodium chloride complex was prepared by: (1) forming a mixture of 217.5 g of di(2-ethylhexyl) phthalate, 19.5 g of sodium chloride, 64 g of water, 4.35 g of lecithin and 5.8 g of a polyoxypropylated quaternary ammonium chloride, sold as "Emcol" CC42 by Witco Chemical Corp.; (2) while the resulting mixture was agitated under moderate to high shear conditions, adding 198 g of flaked MDA; (3) continuing the mixing of the composition for one hour while maintaining its temperature of 58°-60° C.; and (4) removing the water from the resulting dispersion of complex particles in the organic liquid by distillation in an agitated flask at 60° C. under reduced pressure.

The particles of the dispersion obtained in step (4) were particles of a complex of 3 moles of MDA with 1 mole of sodium chloride. They were found to have an average diameter of less than 11 microns.

The dispersion obtained in step (4) had a free MDA content of 1.6%, determined as explained in Example 1.

Curing Agent A-2 (Prior Art—Caruso and Verbanc)

The procedure for preparing curing agent A-1 was repeated with the exception that the amount of polyoxypropylated quaternary ammonium chloride was reduced from 5.8 g to 3.9 g. This dispersion also contained 1.6% free MDA.

Curing Agent B-1 (Prior Art—Hoeschele)

To 102.3 g of curing agent A-1 at 25° C. was added with stirring, 3.6 g (0.016 equivalent) of di-o-tolylcarbodiimide. Stirring was continued until the mixture was homogeneous. The mixture was then stored 5 days prior to use to permit the carbodiimide to fully react with the MDA (see, e.g. Example 1 of Hoeschele).

Curing Agent B-2 (Prior Art—Hoeschele)

The preparation of curing agent B-1 was repeated except that the preparation used 101.9 g of curing agent A-2 in place of 102.3 g of curing agent A-1.

Curing Agent C-1 (The Present Invention)

To 102.3 g of curing agent A-1 at 25° C. was added with stirring, 1.4 g (0.016 equivalent) of an 80/20 mixture of 2,4-/2,6-tolylene diisocyanate. Stirring was continued for 1 hour and then 1 g of lecithin was added. Stirring was continued until a homogeneous mixture was obtained.

Curing Agent C-2 (The Present Invention)

The preparation of curing agent C-1 was repeated except that the preparation used 101.9 g of curing agent A-2 in place of 102.3 g of curing agent A-1.

Each of the six curing agents prepared above was used to cure a prepolymer prepared by reacting two moles of 2,4-tolylene diisocyanate with one mole of polytetramethylene ether glycol (number average molecular weight 980) for 3 hours at 80° C. The procedure for preparing the cured polyurethanes involved mixing sufficient curing agent to provide 95% of the amino groups required to react with the NCO groups of 200 g of the prepolymer at 25° C. The amounts of curing agent used for each of the six preparations were as follows: A-1, 65.5 g; A-2, 61.0 g; B-1, 67.9 g; B-2, 63.2 g; C-1, 68.1 g; and C-2, 65.0 g. The resulting mixtures were heated to 65° C. and agitated under vacuum to remove dissolved gases. The mixtures, still at 65° C., were poured into molds preheated to 130° C., and the molds were placed in a 130° C. oven for 30 minutes to complete the cures.

Stress-strain measurements were made according to ASTM D412 for each of the six cured polyurethanes both as originally prepared and following immersion in water at 100° C. for periods of 2 and 4 days. Following immersion in water, these samples were equilibrated at 24° C. and 50% relative humidity for 7 days prior to stress-strain testing. The results of these measurements are presented in the following table.

|  | Unmodified (Caruso & Verbanc) | | Carbodiimide-Modified (Hoeschele) | | Isocyanate Modified (This Invention) | |
| --- | --- | --- | --- | --- | --- | --- |
|  | A-1 | A-2 | B-1 | B-2 | C-1 | C-2 |
| Original Properties | | | | | | |
| Modulus$_{100}$, MPa | 7.9 | 7.9 | 6.6 | 6.6 | 7.2 | 5.5 |
| Modulus$_{300}$, MPa | 16.5 | 14.8 | 13.1 | 13.8 | 13.4 | 10.3 |
| Tensile Strength at Break, MPa | 27.6 | 27.6 | 20.7 | 23.4 | 28.3 | 20.0 |
| Elongation at Break, % | 385 | 410 | 400 | 400 | 440 | 420 |
| After Water Immersion at 100° C. for 2 Days | | | | | | |
| Modulus$_{100}$, MPa | 5.5 | 6.3 | 5.2 | 5.3 | 6.0 | 4.5 |
| Modulus$_{300}$, MPa | 6.9 | 7.7 | 5.2 | 5.9 | 6.7 | 5.7 |
| Tensile Strength at Break, MPa | 11.0 | 12.4 | 5.2 | 5.9 | 7.2 | 7.2 |
| Elongation at Break, % | 690 | 690 | 300 | 330 | 480 | 550 |
| After Water Immersion at 100° C. for 4 Days | | | | | | |
| Modulus$_{100}$, MPa | 5.2 | 6.6 | 5.5 | 5.2 | 6.0 | 4.3 |
| Modulus$_{300}$, MPa | 6.6 | 7.9 | — | — | 6.6 | 5.2 |
| Tensile Strength at Break, MPa | 7.9 | 10.3 | 5.5 | 5.2 | 6.6 | 5.9 |
| Elongation at Break, % | 600 | 650 | 200 | 200 | 420 | 500 |

It can be seen from the above data that the polyurethanes cured according to the present invention with the isocyanate-modified 3MDA-NaCl complex compositions C-1 and C-2 exhibit a higher resistance to hydrolysis than the polyurethanes cured with the carbodiimide-modified compositions B-1 and B-2 of Hoeschele. This conclusion is based on (a) the changes observed in elongation at break ($E_B$) and (b) the degree of elastomeric character retained by the polyurethanes following water immersion. Elastomeric character is indicated by increases in modulus with increasing elongation. For example, Sample B-1 shows no elastomeric character after either two or four days immersion as can be seen from (a) decrease of $E_B$ and (b) lack of increase of modulus from $M_{100}$ until the sample breaks. By comparison, the prior art sample A-1 and sample C-1 of this invention both show elastomeric character after a two-day immersion, as shown by a steady increase in modulus until the samples break. Sample C-1, nevertheless, reaches a plateau for $M_{300}$, which does not change until break, and the value of $E_B$ decreases slightly. Sample C-2 does not appreciably lose its elastomeric character.

The unmodified prior art compositions of Caruso and Verbanc cure the prepolymer to polyurethanes having the highest hydrolytic stability. However, the drawback of those prior art compositions, as explained earlier, is the poor shelf life of their mixtures with prepolymers.

I claim:

1. A process for preparing a composition useful for curing an isocyanato-terminated polyurethane prepolymer, said process comprising
   (1) forming a mixture of a substantially inert organic liquid (A), with particles, (B), of a complex of 3 moles of 4,4'-methylenedianiline and 1 mole of a salt selected from the group: sodium chloride, sodium bromide, sodium iodide, lithium chloride, lithium bromide and lithium iodide, said particles having an average diameter of less than 60 microns; the weight proportion of liquid (A) in the mixture being about 20–90%, and that of particles (B) being about 10–80%, said mixture having a free methylenedianiline content of about 0.1–5% by weight;
   (2) adding to said mixture with good agitation at least 0.5 equivalent of an organic isocyanate per equivalent of the free methylenedianiline,
   (3) while continuing agitation, allowing said organic isocyanate to react with said methylenedianiline; and
   (4) adding at least 0.5 weight % of lecithin.

2. The process of claim 1 wherein the proportion of the substantially inert liquid is 25–60% based on the combined weight of (A) and (B).

3. The process of claim 2 wherein the inert liquid has a boiling point above 200° C.

4. The process of claim 1 wherein the proportion of free methylenedianiline, prior to the addition of isocyanate is 0.4–3 weight %.

5. The process of claim 1 wherein the proportion of lecithin added in step (4) is 0.5–2 weight %.

6. The process of claim 5 wherein the proportion of lecithin is 0.7–1.7 weight %.

7. The process of claim 1 wherein the proportion of isocyanate added in step (2) is about 0.5–2.0 equivalents per equivalent of free methylenedianiline.

8. The process of claim 7 wherein the proportion of isocyanate is 0.5–1.0 equivalent per equivalent of free methylenedianiline.

9. A composition suitable for curing isocyanato-terminated polyurethane prepolymers, said composition comprising a substantially inert organic liquid, (A) and, dispersed in component (A), particles. (B), of a complex of 3 moles of 4,4'-methylenedianiline and 1 mole of a salt selected from the group: sodium chloride, sodium bromide, sodium iodide, lithium chloride, lithium bromide and lithium iodide; substantially no free methylenedianiline being present in said composition, free methylenedianiline having been removed by (1) adding to the initial dispersion of particles (B) in the liquid (A) with good agitation about 0.5 to 2.0 equivalents of an organic isocyanate per equivalent of the initially present free methylenedianiline;

(2) while continuing agitation, allowing said organic isocyanate to react with said methylenedianiline; and (3) adding at least 0.5 weight percent of lecithin.

10. A composition of claim 9 wherein the proportion of free methylenedianiline prior to the addition of the isocyanate is 0.3–4 weight percent.

11. A composition of claim 9 wherein the proportion of lecithin added in step (3) is 0.7–1.7 weight percent.

12. A curing composition of claim 9 wherein the isocyanate is tolylene diisocyanate.

13. A curable composition containing a composition of claim 9 and an isocyanato-terminated polyurethane prepolymer in such proportions that the curable composition contains about 0.7–1.2 equivalents of amine groups per equivalent of NCO groups.

* * * * *